(No Model.)
F. A. GOOCH.
PROCESS OF PRODUCING HYDROUS CHLORID OF ALUMINIUM.
No. 558,726. Patented Apr. 21, 1896.
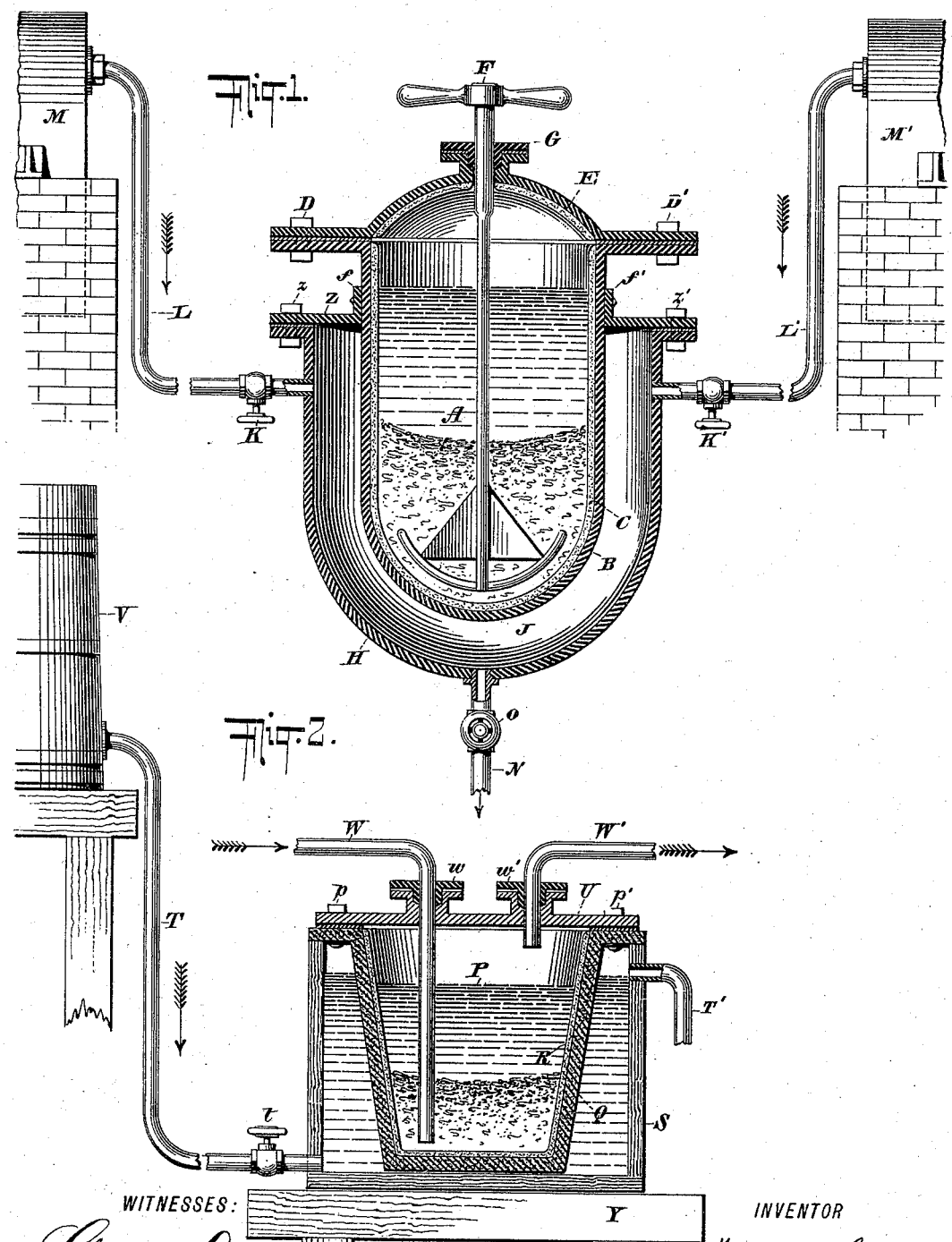
WITNESSES:
Gustave Dieterich
John Kehlenbeck
INVENTOR
Frank A. Gooch
BY
Frank L. Crawford
ATTORNEY

UNITED STATES PATENT OFFICE.

FRANK A. GOOCH, OF NEW HAVEN, CONNECTICUT, ASSIGNOR TO THE WALDO FOUNDRY, OF BRIDGEPORT, CONNECTICUT.

PROCESS OF PRODUCING HYDROUS CHLORID OF ALUMINIUM.

SPECIFICATION forming part of Letters Patent No. 558,726, dated April 21, 1896.

Application filed October 26, 1895. Serial No. 566,949. (No specimens.)

*To all whom it may concern:*

Be it known that I, FRANK A. GOOCH, of the city of New Haven, in the county of New Haven and State of Connecticut, have invented certain new and useful Improvements in Processes of Producing the Hydrous Chlorid of Aluminium; and I do hereby declare the following to be a full, clear, and exact description of the invention, such as will enable others skilled in the art to which it appertains to make and use the same.

My invention relates more particularly to the production of the hydrous cyrstalline chlorid of aluminium represented by the chemical formula $Al_2Cl_6.12H_2O$. This substance is used in the arts for various purposes—for example, in the improved process for reducing aluminium described and claimed in Letters Patent No. 527,851, dated October 23, 1894, and issued to Leonard Waldo and myself; but the methods usually employed for producing the said substance are relatively expensive.

My invention has for its object the easy and inexpensive production of the said chlorid.

My invention relates to processes for producing hydrous aluminium chlorid by heating together a suitable aluminous earth and sulfuric acid and then treating the resulting mass with hydrochloric acid.

In general terms, my invention comprises the improved process herein described for producing hydrous aluminium chlorid, which consists in heating a suitable aluminous earth with sulfuric acid, treating the resulting mass with dilute hydrochloric acid, the mixture being heated under pressure, separating the resulting solution by filtration from the undissolved residue, introducing into the solution gaseous hydrochloric acid, and separating out the resulting precipitate. The aluminous earth employed should be one which is readily acted upon by sulfuric acid, so as to form aluminium sulfate. Preferably I employ either bauxite or clay for this purpose.

For convenience I will describe my invention with reference to the use of bauxite; but I do not limit myself to the employment of that earth. The bauxite being powdered, it is heated with sulfuric acid until the acid fumes. The resulting mass is then treated with dilute hydrochloric acid of about half strength, the mixture being preferably heated under pressure in a suitable closed gas-tight vessel. Hydrous aluminium chlorid, which is extremely insoluble in concentrated hydrochloric acid, is very soluble in dilute hydrochloric acid of about half strength, (specific gravity about 1.10.) For this reason I find that hydrochloric acid of about half strength is a valuable agent for the extraction of aluminium salts from aluminous material soluble in such acid and that the solution obtained by treating such aluminous material with the said acid of about half strength after filtration or other separation of insoluble matter is in a condition readily to deposit in the form of the hydrous crystalline chlorid the aluminium contained in the solution by simply saturating the solution in the cold with hydrochloric-acid gas. The mass obtained by heating together the bauxite and the sulfuric acid contains aluminium sulfate, ferric sulfate, silica, a considerable amount of undecomposed bauxite, and perhaps other foreign matter. If now this mass is treated with dilute hydrochloric acid of about half strength, as above stated, the aluminium sulfate and ferric sulfate are dissolved and the undecomposed ore is acted upon by the hydrochloric acid, which, by extracting a further amount of aluminium, increases the yield of soluble aluminium salts—the chlorid and probably also the sulfate. The effect of the hydrochloric acid of half strength will be much increased if the mixture is heated to or about the temperature of boiling water under atmospheric conditions, the mixture being inclosed in a suitable closed gas-tight vessel, which may be any suitable vessel strong enough to withstand the pressure of the steam and hot acid, and lined with some suitable material capable of resisting the action of the hot acid. A suitable vessel would be any iron steam-digester fitted with a bolted cover and lined with acid-proof enamel. The vessel should be of such limited size that the digestion shall take place under strong pressure produced by confining the gas and steam until the action is complete. The time necessary for the digestion will vary somewhat according to the amount of heat employed and according to the refractoriness of the ore. After the action is complete, there will still be an undissolved residue, consisting chiefly of silica, which may be separated by means of a pressure-filter, vacuum-filter, or other suitable device.

The action of the hydrochloric acid of half strength, as described above, is very different from what would be the action of strong hydrochloric acid. As stated, hydrous aluminium chlorid is very insoluble in strong hydrochloric acid, but it is quite soluble in hydrochloric acid of half strength. Were strong hydrochloric acid to be used in place of the half-strength acid, as above described, the result of its action upon the solution would be to precipitate hydrous aluminium chlorid, which would form an insoluble crust of such chlorid upon the undecomposed ore, tending to act as a mechanical protection, which would prevent thorough decomposition of the ore and any further extraction of aluminium salts therefrom; whereas the half-strength hydrochloric acid has the effect of further decomposing the ore not acted upon by the sulfuric acid and of increasing the amount of aluminium salts in the solution, the operation being preferably performed with the assistance of heat and under pressure, as stated. Should hydrochloric acid of too great strength have been employed in the first instance, it is only necessary to add water in amount sufficient to cause the solution of all the hydrous aluminium chlorid. The undissolved residue, which has been filtered out, can, if desired, be treated again in the same manner by dilute hydrochloric acid heated, as before, under pressure, for the purpose of more perfectly extracting the aluminium salts.

Into the solution obtained as above, after the undissolved residue has been filtered out and the solution has been allowed to cool, hydrochloric acid is introduced in a gaseous form under atmospheric conditions of temperature and pressure and to or nearly to the point of saturation. When the hydrochloric acid has been thus introduced in sufficient quantity, a white precipitate is formed, which settles or may be filtered out, and which is shown by analysis to be the hydrous crystalline chlorid of aluminium $(Al_2Cl_6 12H_2O)$ in a comparatively pure state. The salts of iron and other impurities soluble in strong hydrochloric acid remain in the solution, together with the sulfuric acid produced in the metathesis between the hydrochloric acid and the aluminium sulfate. The hydrous chlorid of aluminium thus obtained may be washed in strong hydrochloric acid, (specific gravity not less than 1.20,) and, if further purification is desired, it may be dissolved in water and further precipitated by again passing the hydrochloric-acid gas into the solution. From the salt as first obtained in the process described other hydrous chlorids of aluminium may be obtained by process of drying. From the mother-liquor remaining after the hydrous chlorid of aluminium has been precipitated and separated out and from the washings the hydrochloric acid and sulfuric acid may in large measure be recovered by known methods and used over again in further repetitions of the process, thus adding greatly to its economy.

Instead of treating the aluminous earth with sulfuric acid, as above described, the crude aluminium sulfate of commerce may be employed, being treated directly with the hydrochloric acid of about half strength. Any suitable apparatus may be employed in the process.

In the drawings, which are hereby made a part of this specification, I have shown one suitable form of apparatus, which may be described as follows:

Figure 1 is a cross-section of a suitable apparatus employed by me for decomposing the mass resulting from heating the bauxite with sulfuric acid by digesting the same with dilute hydrochloric acid under pressure. Fig. 2 is a cross-section of a suitable apparatus employed by me for precipitating the crystalline hydrous chlorid of aluminium from the solution obtained in the first part of the process by saturating the same with hydrochloric-acid gas.

In Fig. 1, H is an iron steam-digester in which J is the steam-chamber, into which the steam is admitted by cocks K K' in pipes L L', which pipes conduct the steam from boilers or steam-chests M M'. B is an inner vessel of iron lined with acid-proof enamel C. A is the chamber within the inner vessel B, in which chamber A is placed the mass resulting from heating the bauxite with the sulfuric acid, together with the hydrochloric acid of half strength. The steam is withdrawn from the chamber J through the pipe N by means of the cock O. The inner vessel B is held in place by an annular bonnet or lid Z, bolted to a circular lip or flange projecting from the rim of the outer vessel by bolts $z\ z'$, the said annular bonnet or lid Z itself having flanges $f\ f'$, which are bolted fast to the sides of the inner vessel J. E is a gas-tight cover lined with acid-proof enamel and bolted fast to flanges projecting from the rim of the inner vessel J by bolts D D'. F is a stirrer used to agitate the mass resulting from heating the bauxite with the sulfuric acid, so as to subject it more fully to the action of the dilute hydrochloric acid. Said stirrer passes through the cover E, making there a tight joint with the cover by means of a stuffing-box G. The mass resulting from heating the bauxite with the sulfuric acid having been placed in the chamber A, together with the dilute acid, steam is admitted into the steam-chamber J, and the mixture is heated to the temperature of boiling water and kept at about that temperature until the action is complete. The gas and steam generated by the heat will produce the desired pressure. The whole apparatus above described may be supported in any suitable way.

In Fig. 2, S is a wooden tank having support Y. Water from any convenient supply V flows through pipe T, and is admitted by a cock $t$ into the bottom of the tank S and flows out of the tank at the surface of the water through the pipe T'. Q is a tank or vessel of convenient material, having an acid-proof earthenware lining R. P is the chamber in the vessel Q, into which is placed the solution obtained in the first part of the process. U is a cover clamped to the vessel Q by bolts $pp'$. Through the said cover enter pipes W W', surrounded by stuffing-boxes $w$ $w'$ to make the joints tight. The hydrochloric-acid gas is introduced through the pipe W, passing down to the bottom of the solution, and after the solution is saturated the excess of gas passes off through the pipe W'. The precipitated hydrous chlorid is shown in the bottom of the chamber P. The water in the tank S serves to keep the contents of the chamber P cold.

I do not claim the process for producing hydrous aluminium chlorid which consists in heating together an aluminous earth with sulfuric acid, treating the resulting mass with water, and introducing into the solution thus formed gaseous hydrochloric acid. I am aware that such process is not new.

What I do claim, and desire to secure by Letters Patent, is—

1. The improved process herein described for producing hydrous chlorid of aluminium, which consists in heating together a suitable aluminous earth with sulfuric acid, treating the resulting mass with dilute hydrochloric acid, separating the solution thus formed from the undissolved residue by filtration, introducing into the solution gaseous hydrochloric acid and separating out the resulting precipitate, substantially as described.

2. The improved process herein described for producing hydrous aluminium chlorid which consists in heating together a suitable aluminous earth with sulfuric acid, treating the resulting mass with dilute hydrochloric acid of about half strength, separating the solution thus formed from the undissolved residue by filtration, introducing into the solution gaseous hydrochloric acid to the point of saturation, and separating out the resulting precipitate, substantially as described.

3. The improved process herein described for producing hydrous aluminium chlorid, which consists in heating a suitable aluminous earth with sulfuric acid until the acid fumes, treating the resulting mass with dilute hydrochloric acid of about half strength, the mixture being suitably heated under pressure, separating the resulting solution by filtration from the undissolved residue, introducing into the solution gaseous hydrochloric acid to the point of saturation, and separating out the resulting precipitate, substantially as described.

4. The improved process herein described for producing hydrous aluminium chlorid, which consists in heating bauxite with sulfuric acid until the acid fumes, treating the resulting mass with dilute hydrochloric acid of about half strength the mixture being suitably heated under pressure in a suitable closed vessel, separating the resulting solution from the undissolved residue by filtration, introducing into the solution gaseous hydrochloric acid to the point of saturation, separating out the precipitated hydrous aluminium chlorid, and washing the same with concentrated hydrochloric acid, substantially as described.

5. The improved process herein described for producing hydrous aluminium chlorid which consists in heating bauxite with sulfuric acid until the acid fumes, then treating the resulting mass with dilute hydrochloric acid of about half strength the mixture being heated under pressure in a suitable closed vessel to about the temperature of boiling water under atmospheric conditions, separating the resulting solution by filtration from the undissolved residue, introducing into the filtered solution gaseous hydrochloric acid to the point of saturation, separating out the precipitated hydrous aluminium chlorid washing the same with concentrated hydrochloric acid, and recovering the acids from the mother-liquor and the washings, substantially as described.

FRANK A. GOOCH.

Witnesses:
PHILIP E. BROWNING,
ISAAC K. PHELPS.